(12) United States Patent
Apfel et al.

(10) Patent No.: US 6,405,225 B1
(45) Date of Patent: Jun. 11, 2002

(54) INTEGRATING EMAIL FUNCTIONALITY INTO A WORD PROCESSOR BY INCORPORATING AN EMAIL GUI WITHIN THE WORD PROCESSOR

(75) Inventors: Darren A. Apfel, Redmond; David M. Buchthal, Duvall; Steve Rayson, Seattle; Andrew G. Carlson, Redmond; Christopher Antos, Kirkland; Hai Liu, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/098,778

(22) Filed: Jun. 17, 1998

(51) Int. Cl.[7] .............................................. G06F 15/02
(52) U.S. Cl. ........................ 707/526; 707/500; 709/206
(58) Field of Search ................................. 707/526, 530, 707/531, 501, 513, 515, 500; 709/206

(56) References Cited

U.S. PATENT DOCUMENTS

| | | | | |
|---|---|---|---|---|
| 5,252,951 A | * | 10/1993 | Tanenbaum et al. | 345/156 |
| 5,283,887 A | * | 2/1994 | Zachery | 707/513 |
| 5,487,141 A | * | 1/1996 | Cain et al. | 345/435 |
| 5,499,359 A | * | 3/1996 | Vijaykumar | 707/201 |
| 5,557,723 A | * | 9/1996 | Holt et al. | 707/506 |
| 5,596,702 A | * | 1/1997 | Stucka et al. | 345/340 |
| 5,734,901 A | * | 3/1998 | Sidhu et al. | 709/300 |
| 5,805,811 A | * | 9/1998 | Pratt et al. | 709/206 |
| 5,818,447 A | | 10/1998 | Wolf et al. | 345/335 |
| 5,835,769 A | * | 11/1998 | Jervis et al. | 717/1 |
| 6,247,020 B1 | * | 6/2001 | Minard | 707/104.1 |

OTHER PUBLICATIONS

Effecting Concurrent Text and Data Processing via Word Processor in Communication With a Mainframe Computer, IBM TBD, vol. 27, Iss.# 3, Aug. 1, 1984, pp.1825–1826.*

Creating Commercial Web Pages, Lemay et al, 1996, Sams.net Publishing, pp. 162–165, and 232–233.*

Microsoft Word 97 screen dumps, Fig. 1–7, 1996.*

Hui et al, A multimedia electronic mail system on a heter. env., Computer, Communication, and Power Engin. pp. 61–64, 1993.*

* cited by examiner

*Primary Examiner*—Stephen S. Hong
*Assistant Examiner*—Cesar B. Paula
(74) *Attorney, Agent, or Firm*—Merchant & Gould

(57) ABSTRACT

An Envelope provides the integration of the functionality of an electronic mail (email) application program and the functionality of a document editor. Users can more easily generate and edit sophisticated documents for email transmission by invoking an Envelope that provides the user with the functions of an email client. A user that is editing a document in a document editor, such as a word processor or spreadsheet application can invoke the Envelope within the user interface of the document editor. The Envelope has its own user interface that is fully functional within the confines of the document editor's user interface to provide the user with the functionality of the email client application program. With the Envelope invoked, the user is enabled to execute many of the email client's functions while still editing the document within the document editor's user interface. Thus, the rich document editing functionality of the document editor is maintained, while the functionality of the email client is simultaneously accessible to the user. Envelope data generated during the editing process is saved with the document and available when the document is next edited or is opened as an email message.

44 Claims, 9 Drawing Sheets

INTEGRATING EMAIL FUNCTIONALITY INTO A WORD PROCESSOR BY INCORPORATING AN EMAIL GUI WITHIN THE WORD PROCESSOR

TECHNICAL FIELD

The present invention relates to a system and method for handling electronic mail (email), and more particularly relates to a system and method for integrating the functionality of an email client and a document editing program.

BACKGROUND OF THE INVENTION

Electronic mail (email) processing, rather than website browsing, is the primary use of the Internet and intranets today. Users are replacing conventional paper correspondence with email. As a result, users are tending to use their email application program (email client) as a document editing tool as well as for its original purpose of transmitting messages. As more and more documents are generated for the express purpose of transmission via email, email clients are becoming the document editors of choice, rather than word processing or other document editing programs. Unfortunately, email clients typically provide substandard document editing capabilities.

In the past there has been a tremendous difference between the editing and formatting options available for email messages and those available for documents generated by more sophisticated document editors. Email messages were generally restricted to the transmission of simple text and relied on formatting conventions that traced their history back to teletypes. For example, "emoticons" such as :-), abbreviations such as <G>, and suggestive formatting such as _underline_ and *bold* were some of the ways utilized to express emotion or to draw emphasis within simple text messages.

While the formatting options available to email client users have remained fairly basic, the formatting options and editing features provided by word processors and other document editing programs have dramatically increased. For example, with a full powered word processor, the user is able to apply a wide variety of editing and formatting options. In addition to the richer formatting, full powered word processors provide powerful editing features, such as background spell checking and automatic correction of common typographical errors. Full powered word processors also allow users to create increasingly sophisticated and complex documents that include drawing objects, text colored with a highlighter, borders, shading, tables, and special bullets. Similarly, other rich editors, such as spreadsheet programs, database programs, and drawing programs provide document editing features far superior to even the most advanced email client available.

As the popularity of email has increased, four changes have taken place. First, some software publishers have added some rich editing capabilities to their email programs. Although this approach allowed a user to change the formatting used in an email message, it required users to edit email messages in an environment that was different than the word processor to which they were accustomed. In addition, the rich editor email programs simply do not possess the broad array of features common to sophisticated document editors.

A second approach has been to add some email capabilities to document editors. Although this simplified the process of sending a message that was created by the document editor, it presented several drawbacks. First, the recipient of the message needed to have a compatible document editor in order to read the message. Second, the editing environment is disconnected from the email environment. Third, this approach does not make it easier to read incoming email from various sources. Fourth, this approach does not accommodate the sending of file attachments to plain text or basic rich text (downlevel) email clients.

A third approach has been one in which users have decided to use a full power word processor for authoring sophisticated and complex documents, and then use email for distribution. This requires the user to work in the word processing context to create and edit the document. When the document is complete, the user must switch to the email program, create a new message, and include the word processor document as an "attachment". Although email is an effective mechanism for transporting documents, handling attachments requires several additional steps on the part of both the sender and the recipient of the message. Additionally, the attached document can only be used by a recipient of the message that has a compatible document editor in order to read the document.

Finally, a fourth approach has been one in which an email client invokes an object-enabled mail note to display an email message and related features of the user interface. The mail note provides a view port in which the document editor displays and edits the body of the email message. The document editor provides its formatting and editing features in the context of the mail note. Programming interfaces between the mail note and the document editor allow the mail note to translate message data back and forth between the document editor's format and the format imposed by the email client. This allowed messages created with a word processor to be read by email clients. Unfortunately, this approach is inefficient because it requires a great deal of communication between the email client and the word processor, which reduces efficiency and consumes processor resources. Furthermore, this approach confuses users as to the availability of various functions of the email client and/or the document editor.

Therefore, there is a need in the art for an efficient, intuitive system that allows users to create sophisticated documents for transmission via electronic mail or other transmission processes. Such a system should provide sophisticated formatting and editing options in the context of the email environment and should provide message data in a format that is compatible with downlevel email clients. The system should be capable of minimizing interaction between the email client and the document editor, in order to increase system efficiency.

SUMMARY OF THE INVENTION

The present invention satisfies the above-described needs by providing a system and method for integrating the functionality of an application program (e.g., an email client) into a document editor (e.g., word processor), such that the functionality is available to a user while the user is editing a document in the document editor. The present invention provides an improved system and method for editing, viewing, and transmitting electronic mail (email) messages. The invention employs an Envelope data architecture to provide the functionality of an email client within the user interface of a document editor (e.g., word processor, spreadsheet, database, etc.). The user can invoke the Envelope to access the email client's functionality within the context of the document editor's user interface. Alternatively, the user can invoke the Envelope to access the document editor's functionality within the context of the email client's user interface.

In one aspect of the invention, a method is provided for generating and editing an email message within the user interface provided by a document editor. An Envelope user interface is displayed to integrate the functionality of an email client within the user interface of the document editor. Envelope data associated with the Envelope is created by the user within the Envelope user interface and defines the parameters by which the email client will transmit the email message. Message Body data is also created by the user and constitutes the body of the email message. The Envelope can be invoked by the user while using the document editor's user interface and causes the email client to transmit the email message in response to the user's command. All Message Body data and Envelope data can be saved with a document, so that it is available when the user recalls the document for a subsequent editing session.

In another aspect of the invention, a computer system is provided for generating an email message within a document editor. The computer system displays the document editor's user interface and the Envelope's user interface. Envelope data and Message body data are created by the user and constitute the email message. The Envelope can be invoked by the user and causes the email client to transmit the email message in response to the user's command and in accordance with the Envelope data.

In yet another aspect of the invention, a method is provided for integrating the functionality of a document editor into an email client. Envelope data and Message Body data are retrieved from a message data file. The method permits a user to utilize the editing capabilities of the document editor, to edit an email message within the context of the user interface of the email client. All Message Body data and Envelope data can be saved within the message data file, so that it is available when the user recalls the email message for a subsequent editing session.

The various aspects of the present invention may be more clearly understood and appreciated from a review of the following detailed description of the disclosed embodiments and by reference to the drawings and claims.

DETAILED DESCRIPTION

Figure 1:
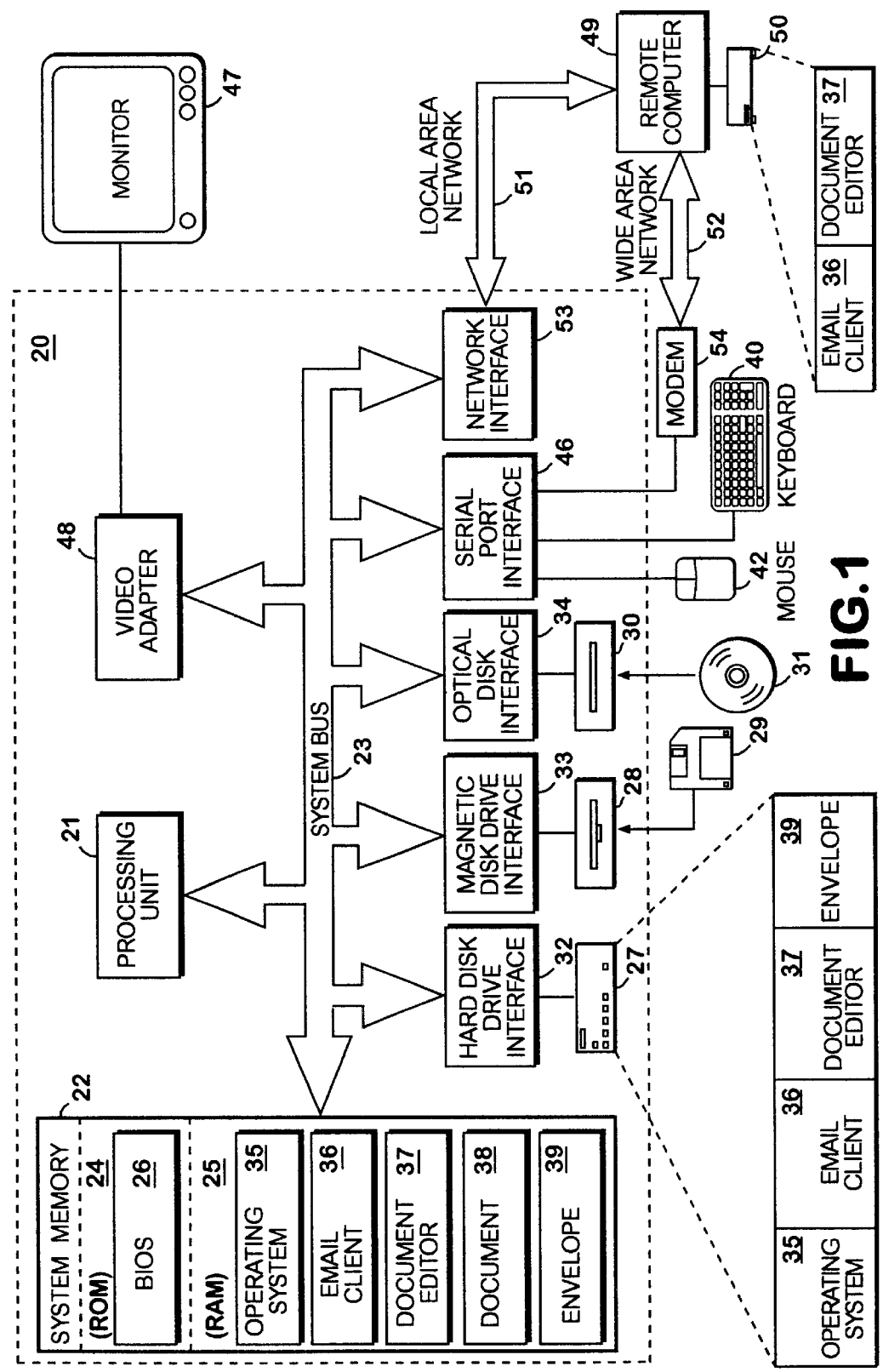
FIG. 1 is a block diagram of a computer system that provides the operating environment for an exemplary embodiment of the present invention.

The present invention is directed to a system and method for integrating the functionality of an application program (e.g., an email client) into a document editor (e.g., word processor), such that the functionality is available to a user while the user is editing a document in the document editor. In one embodiment, an improved system and method is provided for editing, viewing, and transmitting electronic mail (email) messages. Generally described, this embodiment employs an Envelope data architecture to provide the functionality of an email client within the user interface of a document editor (e.g., word processor, spreadsheet, database, etc.). Instead of creating the document in the document editor and then sending the document as an attachment to an email note in the email client, the user can invoke the Envelope and access the email client's functionality within the context of the document editor's user interface.

Those skilled in the art will appreciate that an exemplary embodiment of the present invention relies on and incorporates several common features of modern personal computers. In order to provide a sufficient background for an embodiment of the present invention, it is useful to first discuss a variety of topics, including an exemplary operating system, the Object Linking and Embedding (OLE) interface, and the Messaging Application Programming Interface (MAPI). An exemplary embodiment of the present invention will be described within the context of each of these components.

Referring now to the drawings, in which like numerals represent like elements throughout the several figures, aspects of the present invention and an exemplary operating environment will be described.

An Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more email client application programs 36, a document editing application program 37, documents 38, and any number of other program modules, such as an Envelope program module 39. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is represented by the "MICROSOFT OUTLOOK" and "MICROSOFT OUTLOOK EXPRESS" email clients and document editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

The OLE Interface

The Microsoft Corporation manufactures and distributes an interface known as the Object Linking and Embedding (OLE) interface, which is supported by the "MICROSOFT WINDOWS 95" and "MICROSOFT WINDOWS NT" operating systems. OLE is a technology that enables developers to create extensible application programs that operate across multiple platforms. OLE-enabled applications allow users to manipulate information in an intuitive manner, using an environment that is more "document-centric" and less "application-centric". Users can create compound documents with data, or objects, of different formats, and focus directly on the data rather than on the application programs responsible for generating the data. The data can be embedded within the document, or linked to it, so that only a reference to the data is actually stored as part of the document itself.

OLE facilitates application integration by defining a set of standard interfaces, which are groupings of semantically-related functions through which one program module (or application program) accesses the services of another. OLE is an open system in the sense that any application program can provide an implementation of a defined interface and any application program can use it. Application programs can either take advantage of built-in functionality provided by OLE, or add to it or replace it as best suits their needs.

The set of OLE services can be viewed as a two tier hierarchy. The lower level contains infrastructure services. These are basic services that provide the means by which features can be implemented and used. The infrastructure services include interface negotiation, memory management, error and status reporting, interprocess communication, structured storage, and data transfer. The upper level of the OLE service hierarchy provides application features, which are the services that benefit the end user. These include compound document management, in-place activation, programmability, and drag and drop operations.

OLE's interfaces provide the standard for component object interaction. Each interface contains a set of functions that defines a contract between the object implementing the interface and the client using it. The contract includes the name of the interface, the function names, and the parameter names and types. Under this contract, the object must implement all of the functions defined for that interface and the implementations must conform to the contract. Generally, a component object is said to make a "function call" when it contracts with another object to implement one or more functions.

Standard OLE interface names are prefixed with either "I" or "IOle ." Interfaces that begin with "IOle" provide services relating to compound document management. Those that begin with "I" provide services that are more general in nature. For example, IOleObject contains methods used by a client of an embedded or linked compound document object. IOleObject is implemented and used only by applications that participate in compound document management. IDataObject, however, contains methods that are used by all applications. These methods provide the means by which data of any type is transferred. To these standard OLE interface names, the Microsoft Corporation has added a series of interface names, designed to operate in conjunction with their "MICROSOFT OFFICE" application program. These interface names begin with "IMso".

OLE supports the provision of a "compound document," which is a container object that contains a "linked" object or an "embedded" object. The difference between linked and embedded objects has to do with where the actual source data associated with the object is stored. This affects the object's portability, its method of activation, and the size of the compound document.

When an object is linked, the source data continues to reside wherever it was initially created, which may be at another point in the document or in another document altogether. Only a reference, or link, to the object is kept within the compound document. Linking is efficient and minimizes the size of the compound document. Changes made to the source are automatically reflected in any compound document that has a link to the source object. From the user's point of view, a linked object appears to be wholly contained within the document.

With an embedded object, a copy of the original object is physically stored in the compound document, along with all of the information needed to manage that object. As a result, the object becomes a physical part of the document. A compound document containing an embedded object will be larger than one containing the same objects as links. However, embedding offers advantages that offset the larger storage requirement. For example, compound objects with embedded objects can be transferred to another computer and edited there.

Embedded objects can be edited, or activated in place. This means that all maintenance of the object can be done without leaving the compound document. In order to edit the embedded object, the object must be explicitly activated or opened by performing an action such as double-clicking on the object's icon. This results in the object being displayed in a separate window with the user interface provided by the application program that created the object. The object is said to become in-place active (i.e., it is editable), and UI active (i.e., it displays the user interface associated with the application program that created the embedded object).

In summary, OLE allows objects to be embedded in a compound document. Generally, the embedded document is displayed in a container in what is referred to as the object view. The container controls the appearance of the page and the layout of headers, footers, end notes, etc. The embedded object has no control over these aspects of the page. The container also controls the amount of space that is allocated to the embedded object for displaying its pictorial representation. In the context of the present invention, an object, referred to as the Envelope, is embedded within a document and provides a user interface enabling the transmission of the document as an email message.

The MAPI Messaging Architecture

In an exemplary embodiment of the present invention, the Envelope is provided in the form of a mail note that is used to send and receive email messages. A significant portion of the mail note's activity involves interacting with an email client application program, such as "MICROSOFT OUTLOOK". In an exemplary embodiment, the operating system supports, and the email client complies with, the Messaging Application Programming Interface (MAPI). The MAPI architecture is designed to make it easy for programmers to write messaging-enabled applications that are independent of the underlying messaging system. MAPI provides high-level functions that can be used to implement sophisticated messaging features with a relatively small amount of code. The code deals only with functions for sending, receiving, and addressing messages. The underlying messaging system is completely transparent. MAPI also provides other message-related functionality, such as access to address books.

Figure 2:
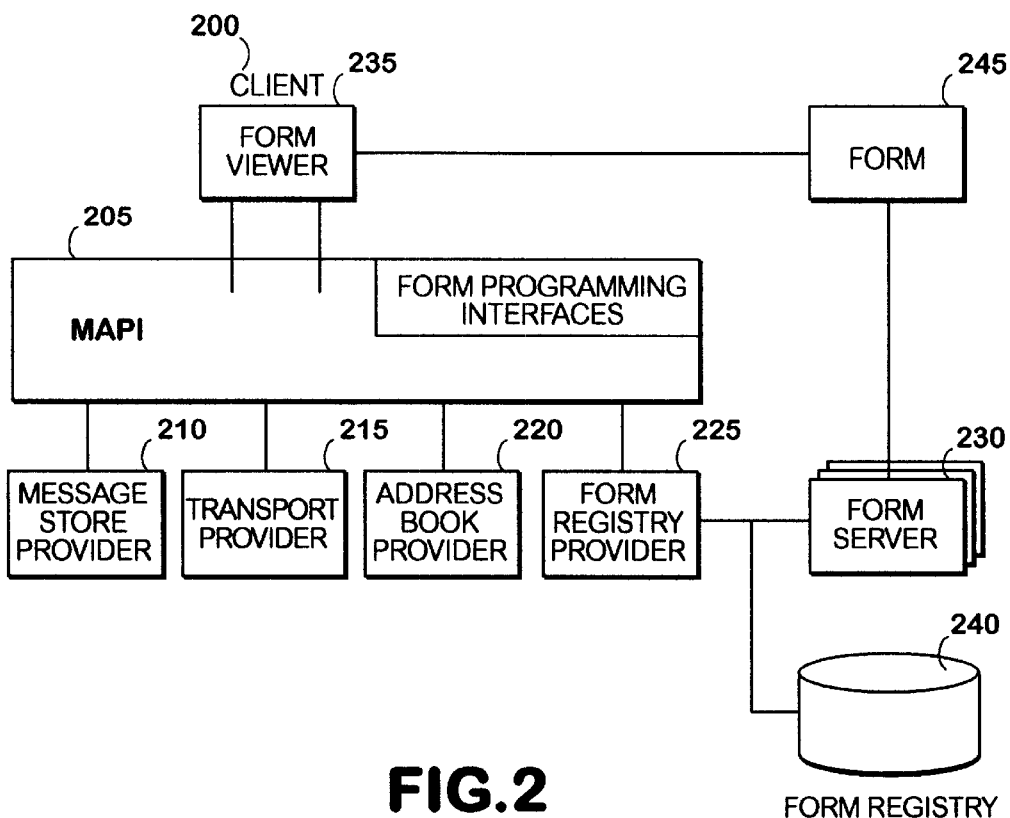
FIG. 2 is a block diagram depicting the major components of an exemplary Messaging Application Programming Interface.

FIG. 2 illustrates portions of the modular architecture defined by MAPI. An email client 200 is an application program that takes advantage of the MAPI subsystem 205. The MAPI subsystem 205 is made up of a MAPI spooler, a common user interface, and programming interfaces. The MAPI spooler is a separate interface that is responsible for sending messages to and receiving messages from a messaging system. The common user interface is a set of dialog boxes that gives email clients a consistent look and users a consistent way to perform tasks.

The programming interfaces are used by the MAPI subsystem 205, by an email client 200, and by service provider writers. The main programming interface is an object-based interface known as the MAPI programming interface, which is based on the OLE Component Object Model.

The MAPI spooler is a separate process within the MAPI subsystem 205 and is responsible for sending messages to and receiving message from a messaging system. The spooler runs as a background process and also performs several functions related to messaging distribution. These include informing an email client when a new message has been delivered, invoking message preprocessing and post processing, generating reports that indicate that message delivery has occurred, and maintaining status on processed recipients.

MAPI service providers are located between MAPI subsystem 205 and the messaging system (not shown). Service providers are drivers that connect MAPI email clients 200 to an underlying messaging system. Most messaging systems include three types of service providers: message store providers 210, address book or directory providers 220, and message transport providers 215. The service providers work with MAPI to create and send messages in the following way. Messages are created using a form 245 that is appropriate for the specific type, or class, of message. The completed message is addressed to one or more recipients. When the client sends the message, the message store provider 210 checks that each recipient has a unique and valid address and that the message has all of the information necessary for transmission. If there is a question about a recipient, such as can occur when there are multiple recipients with the same name, an address book provider resolves the ambiguity. The message in then placed in the outbound queue.

Address book providers 220 handle access to directory information. Depending on the type of recipient and the address book provider, there is a wide range of information that can be made available. For example, all address book providers 220 typically store a recipient's name, address, and address type and organize the data using one or more containers. MAPI integrates all the information supplied by the installed address book providers into a single address book, thereby presenting a unified view to the email client.

Message store providers 210 handle the storage and retrieval of messages and other information for the users of email clients. The message information is organized using a hierarchical system known as a message store, which is implemented in multiple levels, with containers called folders holding messages of different types.

Transport providers 215 handle message transmission and reception. They control the interaction between the MAPI spooler and the underlying messaging system. They also implement security if necessary and take care of any pre-processing and post-processing tasks that are required. Email clients 200 communicate with the transport providers 215 through a message store provider 210. When an incoming message is detected, the transport provider 215 informs the MAPI spooler and the message is delivered to the appropriate message store. To handle outgoing messages, the message store moves the message to the outbound queue, informs the MAPI spooler, and the spooler transfers it to the appropriate transport providers.

Email client users can access a summary view of the messages contained within each folder or view the messages individually using a form 245. Whether the client displays a standard form supplied by MAPI or a custom form supplied by a form developer depends on the type, or class, of the message. Messages are the units of data transferred from one user to another. Every message contains some text, which is formatted simply or more intricately depending on the form that is used, and envelope information that is used for transmission.

Every custom form implements a set of standard menu commands (e.g., open, create, delete, reply, and forward) and a set of commands that are specific to that particular form. The MAPI form architecture involves three main components: a form registry provider 225, a form server 230, and a form viewer 235.

The form registry provider 225 maintains a library of information about all of the forms available on the computer and enables the client to select a form that is suitable for the message being displayed. Form data is stored in a form registry 240, which is stored in one of the computer's memory storage devices. The form server 230 is responsible for displaying the form and providing the information for the display. The form server manages the user's interaction with the form by interpreting the menu selections and processing the messages. The form viewer 235 is a component within an email client that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft Corporation, and which is incorporated herein by reference. Those skilled in the art will appreciate that the MAPI messaging API (Application Programming Interface) is but one means of implementing an exemplary embodiment of the invention. The present invention may be implemented with virtually any messaging API.

The Envelope

Figure 3:
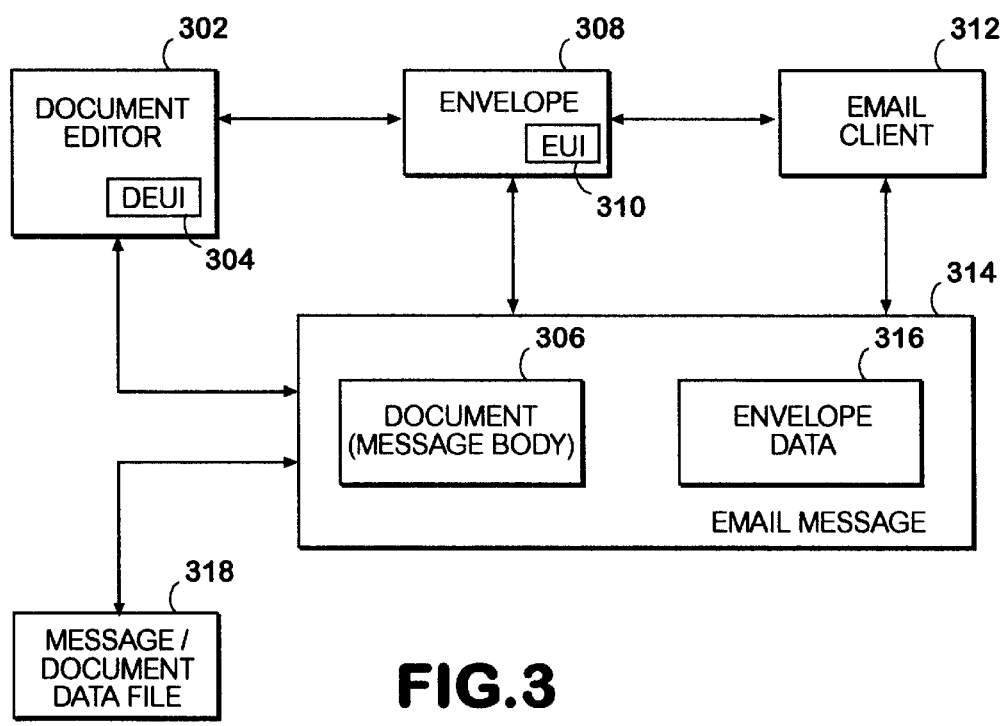
FIG. 3 is a block diagram depicting the major components of an exemplary embodiment of the present invention.

In one embodiment of the present invention, the functionality of an email client can be integrated into a document editor's user interface (DEUI) so that the functionality of the email client is available to a user of the document editor. In this context, the need for functionality integration will commonly arise in two situations: where the user is operating the document editor and wishes to send an edited document to a recipient or where the user is operating the email client and wishes to employ the rich editing functionality of the document editor. FIG. 3 depicts a block diagram of the major components utilized by an exemplary embodiment of the present invention to provide for such functionality integration.

Generally stated, the Envelope of an exemplary embodiment of the present invention is an object including computer-executable instructions and data for executing those instructions. The Envelope serves as a conduit between a document editor and an email client, such that the functionality of the email client is provided within the Graphical User Interface of the document editor, while the data necessary to transmit a document as an email message is provided to the email client. In this exemplary embodiment, the email client can transmit the email message according to the data provided by the Envelope.

The Envelope concept is more efficient that other functionality integration models, because the Envelope embeds (using OLE) a small User Interface object into the document editor, rather than a large object embodying an entire application program (e.g., an email client). In previous functionality integration models, an entire document editor would be embedded into an email note of the email client as an object and the document editor would receive data from the embedded object.

Typically, the document editor 302 will have its own user interface, the Document Editor User Interface (DEUI) 304. In the first situation mentioned above, the user operates the document editor 302 by interacting with the DEUI 304, to generate and/or edit a document 306. An Envelope 308 supplies the functionality of an email client 312 to the document editor 302 and the DEUI 304. The Envelope 308 has its own user interface, the Envelope User Interface (EUI) 310. The EUI 310 provides any type of Command Bar controls (e.g., toolbars, menus, etc.) needed to integrate the functionality of the email client 312. Once the Envelope 308 has been invoked, the EUI 310 will be accessible to the user and provides the means by which the functionality of the email client 312 is invoked.

When the Envelope 308 has been invoked, the Document 306 can be made part of an email message 314. The portion of the email message 314 containing the document 306 is referred to as the Message Body or the message content. Just as the document editor 302 can be a word processor, a spreadsheet program, a graphical presentation program or any other document generator, the document (Message Body) 306 can consist of text, formulas, graphics, and any other matter capable of being reproduced by a computer.

Another portion of the email message 314 is the Envelope data 316 portion. The Envelope data 316 contains information that is used by the email client 312 to transmit the email message and is also referred to as the message address data. In one embodiment of the present invention, the Envelope data 316 may include addressee data, subject data, carbon copy recipient data, blind copy recipient data and other information pertaining to the transmission and delivery of the email message.

The email message may be stored as a message or as a document to a message/document data file 318. Regardless of whether the email message is stored as a message or as a document, the Envelope data 316 is said to "persist" with the stored message/document. That is, when Envelope data has been changed by the user (with the document editor or the email client), the changes will be saved with the document or email message in the message/document data file 318. As will be clear to those skilled in the art, the message/document file may be stored in either volatile memory (e.g., RAM 25) or non-volatile memory (e.g., Hard Disk Drive 27). Moreover, the message/document data file may be implemented as more than one data file.

Advantageously, the Envelope can provide a means for "roundtripping" documents in the format provided by the document editor. By saving the message/document in a universally readable format (e.g., Hyper Text Markup Language), the email message can be opened and read by anyone with a browser or other application program capable of viewing the universal format. Thus, even recipients without a document editor compatible to that of the sender (i.e., the originating document editor) can view the document. Because the Envelope integrates the functions of the document editor and the email client, however, the rich formatting of the originating document editor can also be saved and transmitted with the message/document. Thus, the rich formatting information is available for subsequent recipients that have document editors compatible with the originating document editor.

Those skilled in the art will appreciate that the document editor can be any application program or program module capable of producing a document. Document is used in this description to mean any item or collection of items that can be reproduced by a computer. In an exemplary embodiment, a document is any item or collection of items that can be represented in Hyper Text Markup Language (HTML). Similarly, those skilled in the art will appreciate that the email client can be replaced by any application program the funcionality of which can be implemented within the context of the document editor.

The arrows between the components depicted in FIG. 3 indicate the flow of data and function calls between each of the components. A more detailed discussion of the interaction between these components will be provided in connection with FIGS. 5–7, below.

The Envelope User Interface

As discussed in connection with FIG. 3, in an exemplary embodiment of the present invention, the Envelope can be comprised of computer-executable instructions and data. The Envelope of such an embodiment can be manifested to the user in the form of a Graphical User Interface, the Envelope User Interface (EUI). The data component of the Envelope is referred to as the "Envelope data," which comprises the addressee, carbon copy, and other information representing the user's instructions for delivery of the document as an email message.

Figure 4A:
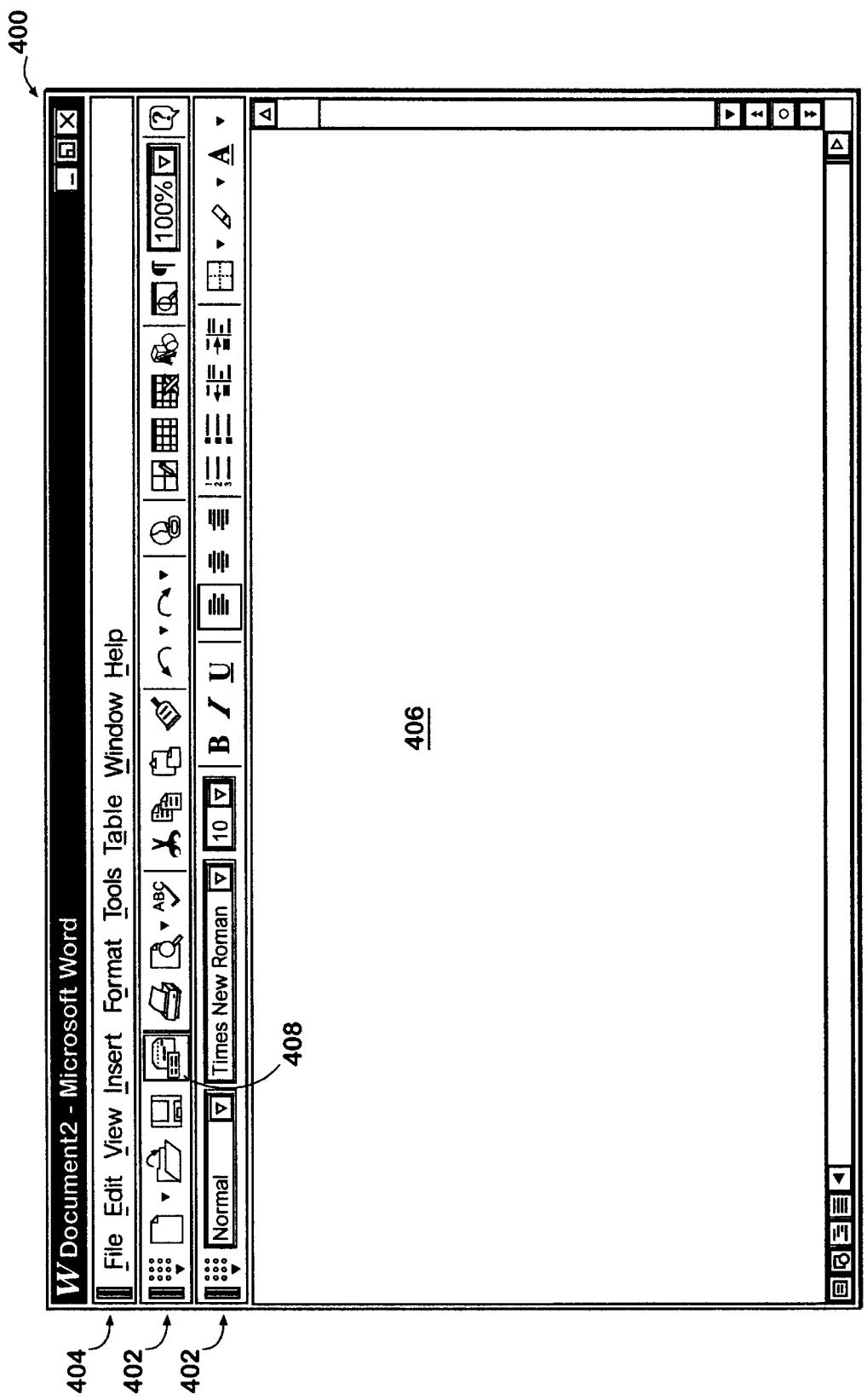
FIGS. 4a and 4b are pictorial representations of exemplary user interfaces of an exemplary embodiment of the present invention.

Referring now to FIG. 4a, an exemplary embodiment of the present invention is shown in the context of a word processing document editor. The DEUI 400 comprises the toolbars 402 and menus 404 for operating the "MICROSOFT WORD" word processing document editor. The editing region 406 of the DEUI 400 provides the display area in which the user will see the document that the user is generating or editing in the document editor. The editing region 406 contains the data that will constitute the Message Body of the email message, when the document (embodied in the editing region 406) is transmitted or stored as an email message. The contents of the editing region 406 is also referred to as the message content data.

Figure 4B:
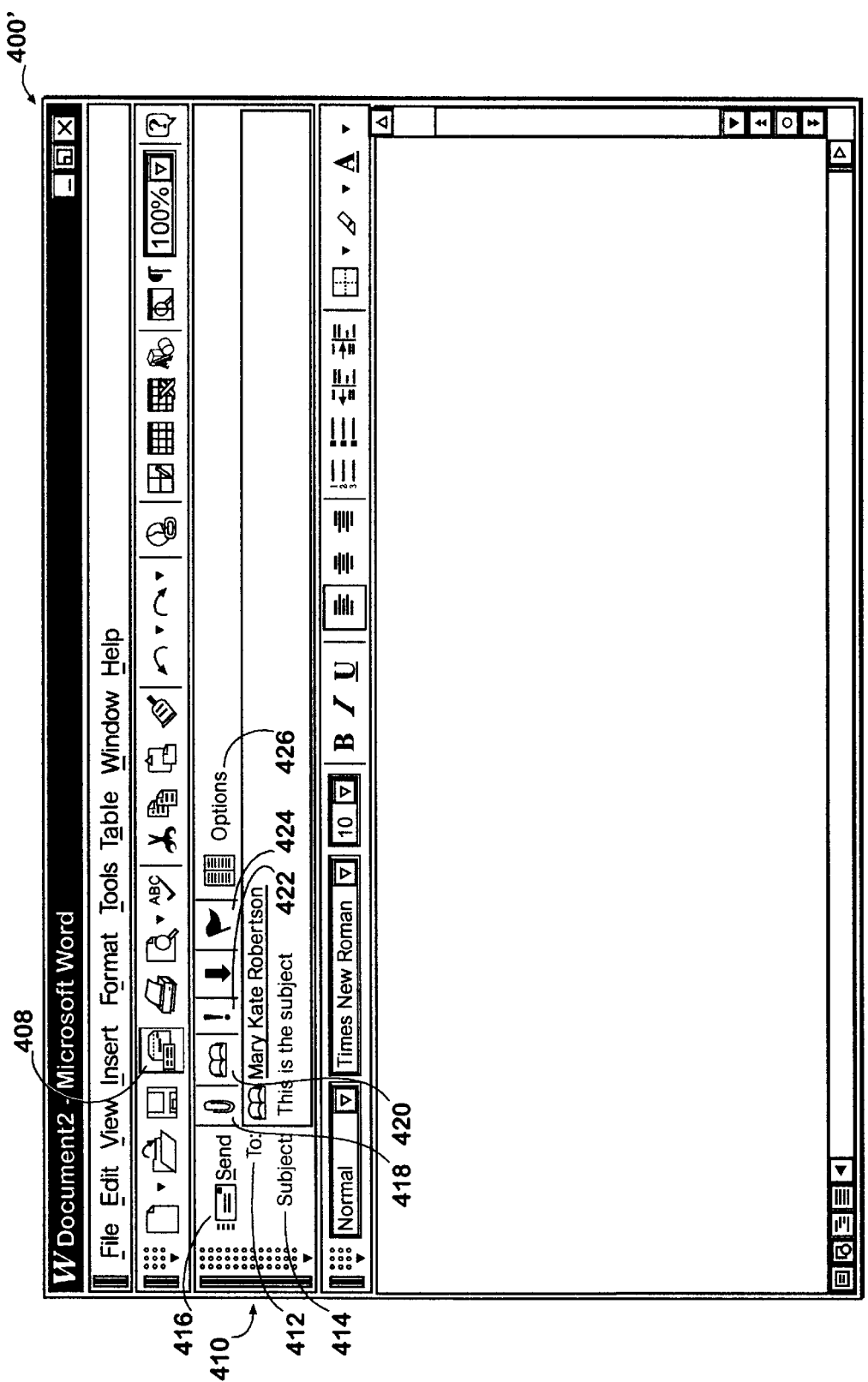

To invoke the Envelope, the user can press an Envelope enable button 408. Referring now to FIG. 4b, a DEUI 400' is depicted as it would exist following the user's pressing the Envelope enable button 408. In this embodiment of the present invention, the Envelope is embodied within EUI 410. The EUI provides all of the functionality of the Envelope which, in turn, provides at least a subset of the functionality of the email client.

The EUI 410 is comprised of a group of function buttons and data fields. The TO data field 412 permits the user to input one or more recipients (addressees) to whom the email message will be transmitted. The SUBJECT data field 414 permits the user to provide a title for the email message, which can be displayed for quick reference by the recipient or by the sending user. The EUI 410 may also be equipped with a blind copy data field (not shown) and a carbon copy data field (not shown) for the purposes of transmitting the email message to other parties besides the addressee. The EUI may also be equipped with an attachment data field (not shown) for attaching other documents and/or data files to the email message.

The function buttons of the EUI, provide the user access to a subset of the email client's functions. The EUI 410 has a SEND button 416 that commands the Envelope to transmit the email message in accordance with the data (i.e., Envelope data) entered into the TO and SUBJECT data fields. The EUI 410 also has an attachment button 418, which permits the user to designate one or more files to be transmitted with the document as attachments (i.e., separate from the Message Body). An address book button 420 is also provided, permitting the user to check a predefined list of addressees to determine or verify email addresses. A check names button 422 is also provided for comparing the addressee names entered by the user against an address book. The user can mark the email message by clicking on the flag button 424 and can access email options by clicking on the options button 426.

The EUI 410 can also be provided with other buttons not depicted in FIGS. 4a and 4b for various other features. For example, a button may be provided to hide or display the blind copy data field or the FROM data field. Another example is a button for indicating that the message is a high or low priority message. Those skilled in the art will appreciate that buttons and other data fields and/or indicators can be used to integrate the full functionality of an email client into the EUI 410.

All of these functions are normally provided by the user's email client, but are integrated into the DEUI 400' and are fully functional within the context of the DEUI 400'. Advantageously, this reduces user confusion, because the functions have been provided by the EUI 410 without interfering with the look and feel of the DEUI 400'. Thus, the user's perception is that the functionality of the email client is seamlessly provided by the document editor (here, the word processor) without switching between operations or applications.

In addition, a user can utilize the EUI 410 within the context of the DEUI 400' to compose email messages, reply to received email messages, and forward received email messages. However, unlike previously available attempts at functionality integration, all of the address data (Envelope data) can be stored with the message data (Message Body) as part of a document. When re-loaded from the data file, the document is readable and editable by the document editor, despite the fact that all of the address data is stored with it. Of course, the address data is available for use by the user, at any time the user chooses to invoke the EUI 410.

The Envelope OLE Interfaces

A conceptual definition of the Envelope has been provided above, in connection with FIGS. 3 and 4. In an exemplary embodiment of the present invention, however, the Envelope can be defined as a series of steps that provide for the functionality integration of the document editor and the email client. When the steps are invoked, the email client's functionality can be made available to the document editor's user and the document and Envelope data generated within the document editor can be passed to the email client for delivery as an email message. In an exemplary embodiment of the present invention, the steps are performed by a series of function calls within the context of the OLE interface model described above. The interaction between the component objects of an exemplary embodiment of the present invention is referred to as the Envelope interface.

Figure 5:
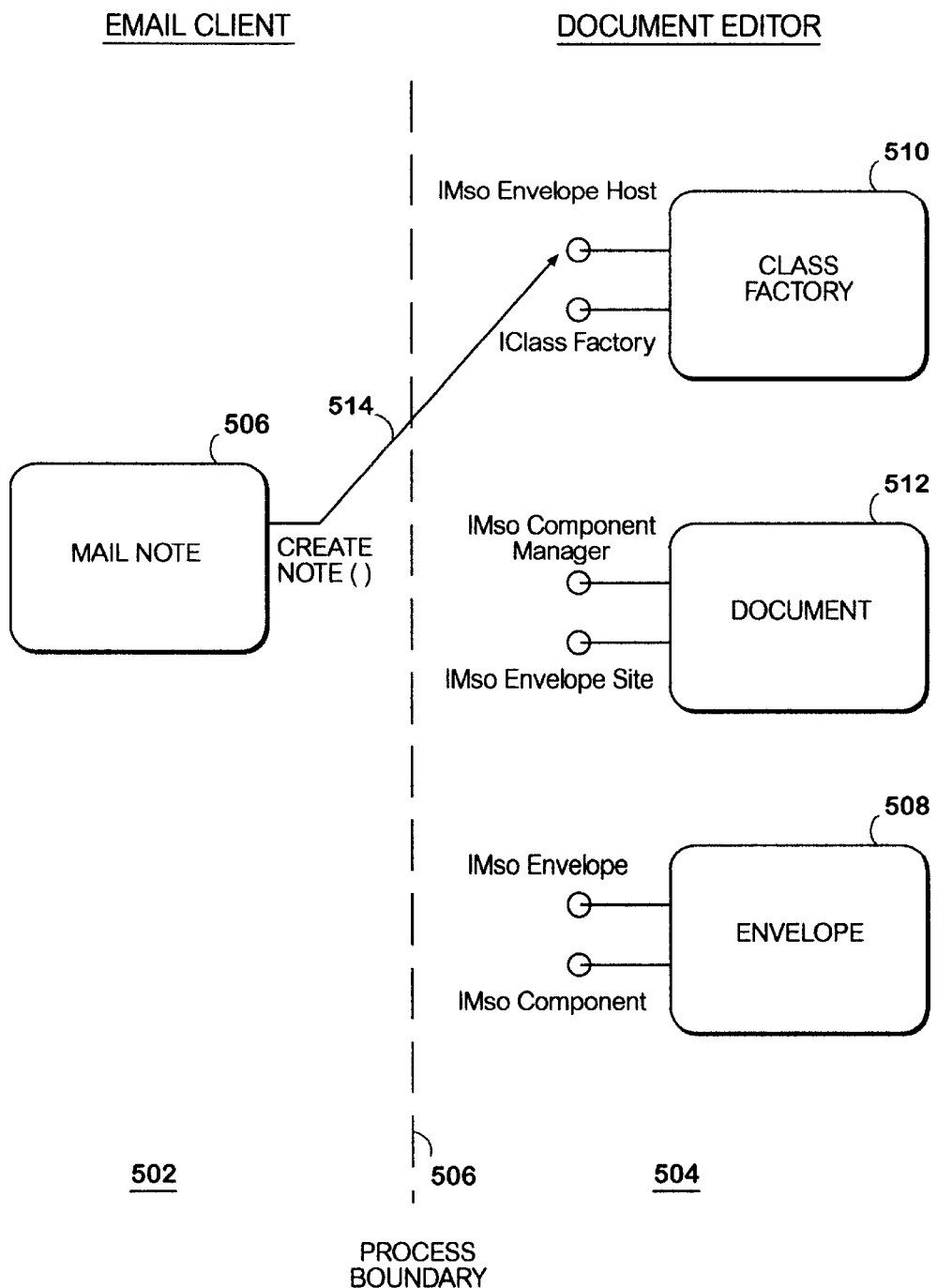
FIG. 5 is a block diagram depicting the interface between an email client and a document editor in an exemplary embodiment of the present invention.

Referring now to FIG. 5, an exemplary Envelope interface diagram is shown, depicting the interaction between the email client on the left side 502 and the document editor on the right side 504. The processes are conceptually separated by the process boundary 506. The process boundary defines the barrier between the process space of the email client and the process space of the document editor. A number of logical components are involved in implementing the Envelope interface. These components can be configured to follow the client/server model, wherein a client (the email client mail note 506) requests service from a mail server, the Envelope component 508. This client/server model is well known to those skilled in the computer arts.

FIG. 5 illustrates the components that are included on the client side and the server side of the Envelope interface. The server side includes a class factory 510 associated with the document editor. The class factory 510 is operative to generate new documents that are compatible with and editable by the document editor (e.g., a document having a network of empty cells for a spreadsheet document editor).

The server side also includes a Document component 512 and an Envelope component 508. The Document component 512 and the Envelope component 508 may constitute a single object or may constitute separate objects. The lines and circles that extend from the class factory component 510, the Document component 512 and the Envelope component 508 represent the interfaces that are supported by each logical component. The client side includes the Mail Note component 506. The IMsoEnvelopeHost, IMsoEnvelopeSite and IMsoEnvelope interfaces are part of the Envelope interface. The remaining interfaces, the IClassFactory, IMsoComponentManager, and IMsoComponent are part of the standard OLE interfaces designed to operate within the context of "MICROSOFT OFFICE" application program.

Primary Envelope Interfaces

In order for the Envelope to be invoked, in this embodiment of the present invention, the Mail Note component 506 makes a CreateNote ( ) function call 514. The CreateNote( ) function call 514 is sent to the IMsoEnvelopeHost interface of the class factory component 510 and causes the document editor to create a new document. Here, the Document component 512 is created. The CreateNote ( ) function call 514 also causes the document editor to create the Envelope component 508.

The Document component 512 supports the ImsoEnvelopeSite interface. This is the primary interface by which the Document component 512 requests services from the Envelope component 508.

The Envelope component 508 supports the ImsoEnvelope interface. This is the primary interface by which the Envelope component 508 requests data from the Document component 512.

Figure 6A:
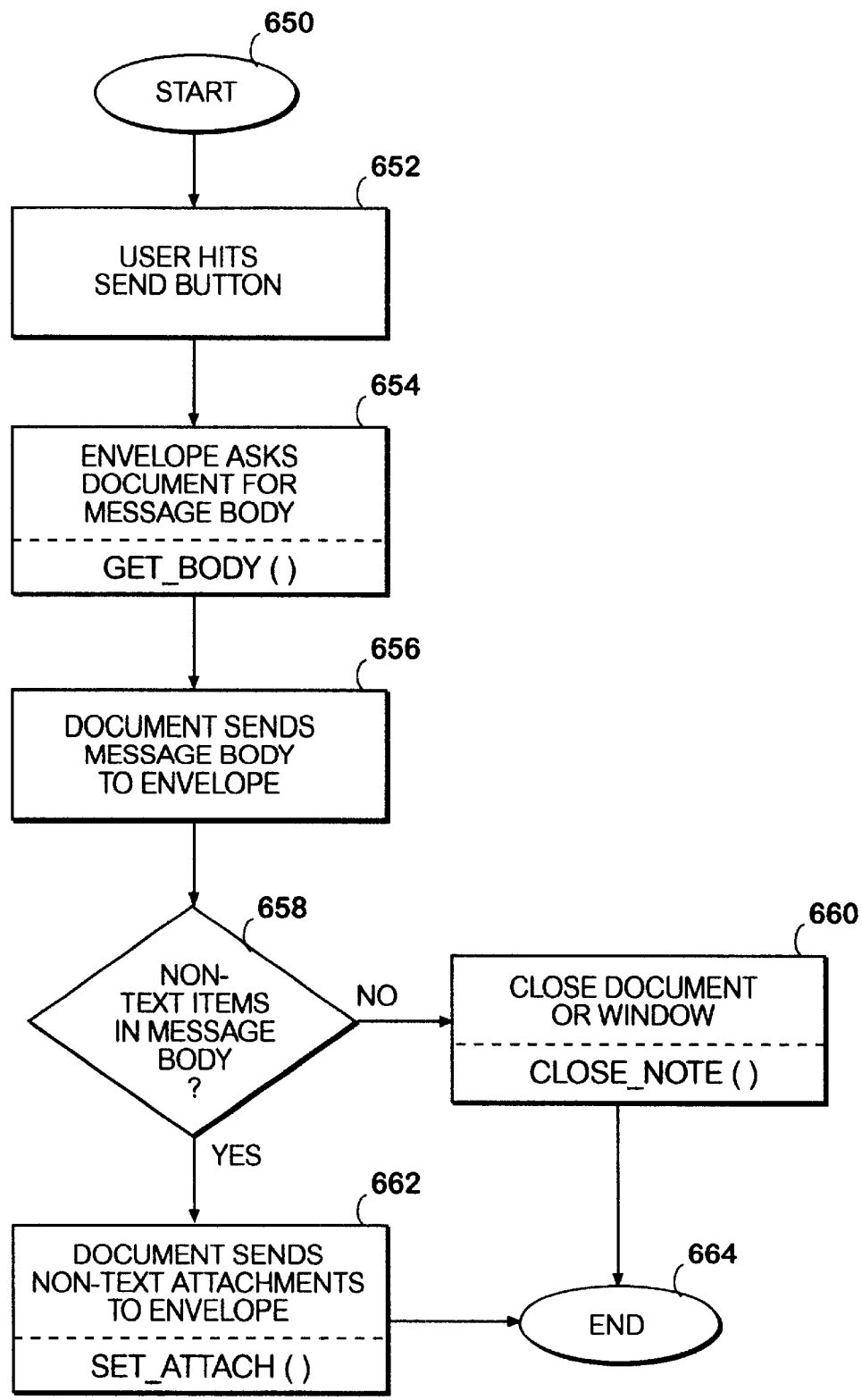
FIG. 6a is a flowchart depicting a method of interfacing an email client and a document editor in an exemplary embodiment of the present invention.
Figure 6B:
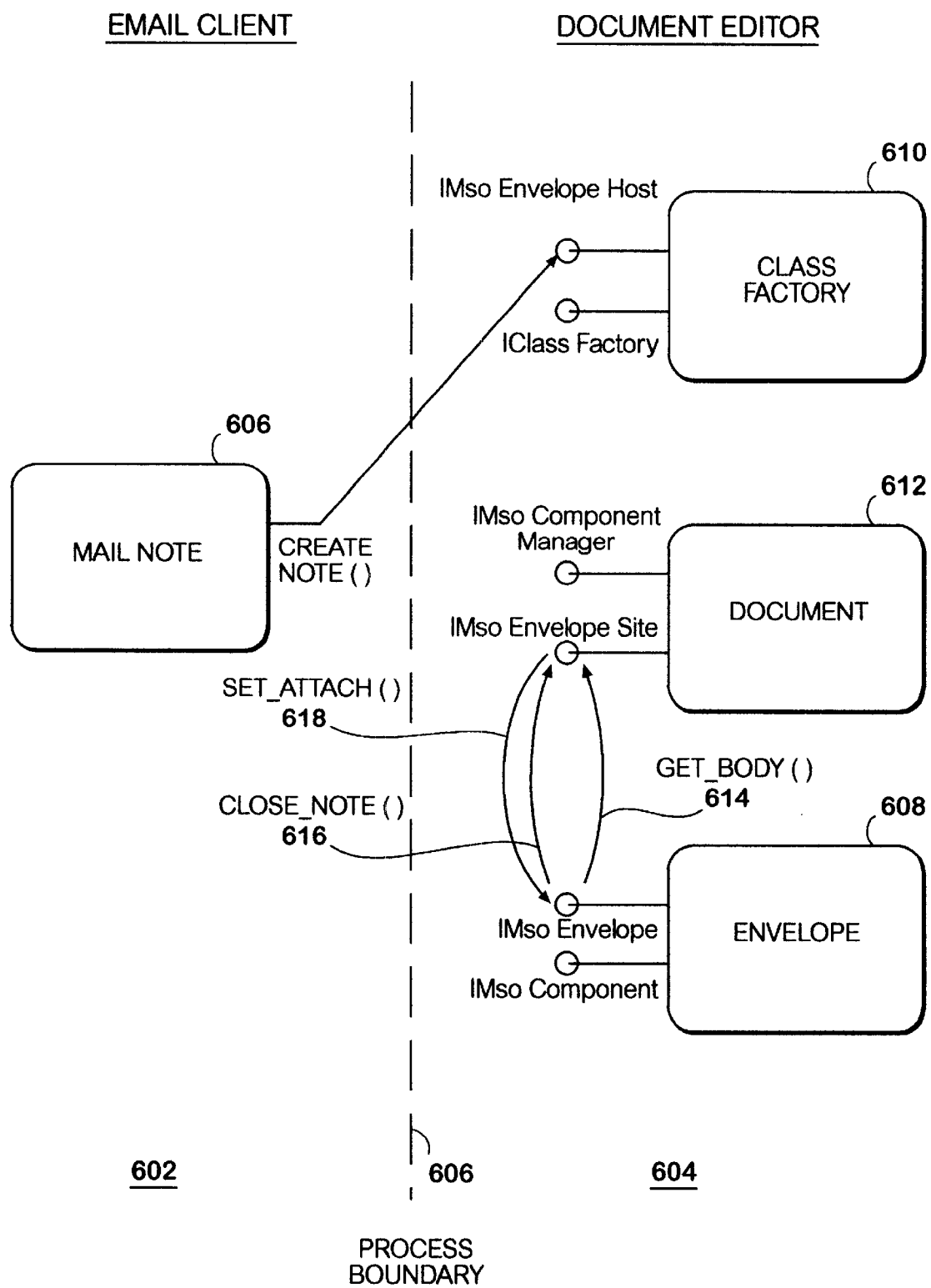
FIG. 6b is a block diagram depicting the interface between an email client and a document editor in an exemplary embodiment of the present invention.

Referring now to FIG. 6a, a flowchart is depicted, illustrating a method of an exemplary embodiment of the present invention when the user attempts to send an email message. The flowchart depicts the method as a series of steps, many of the steps include a description of the step as well as an OLE function call associated with the step. FIG. 6b is a modified version of the Envelope interface diagram depicted in FIG. 5, with the function calls depicted with arrows indicating the source component and recipient component of each call.

Referring now to FIGS. 6a and 6b, the method begins at step 650 and proceeds to step 652. At step 652, the user clicks on the SEND button to send the document as an email message. The method proceeds to step 654, at which the Envelope component 608 asks the Document component 612 for the Message Body to be included in the email message. This request is made by calling the GetBody ( ) function call 614. The method then proceeds to step 656 at which the Document component 612 begins transmission of the Message Body to the Envelope component 608.

During transmission of the Message Body, the Document component 612 monitors the document for non-text Message Body data, such as graphics. At step 658, a determination is made as to whether non-text items exist in the Message Body. If non-text items exist in the Message Body, then the method branches to step 662 and the Document component 612 calls the SetAttach ( ) function call 618, enabling the transmission of the non-text items to the Envelope component 608. If no non-text items exist in the Message Body, then the method branches to step 660 and the Envelope component calls the CloseNote function call 616, causing the document editor to either close the window or to close the document. In either case, the method ends at step 664.

Figure 7A:
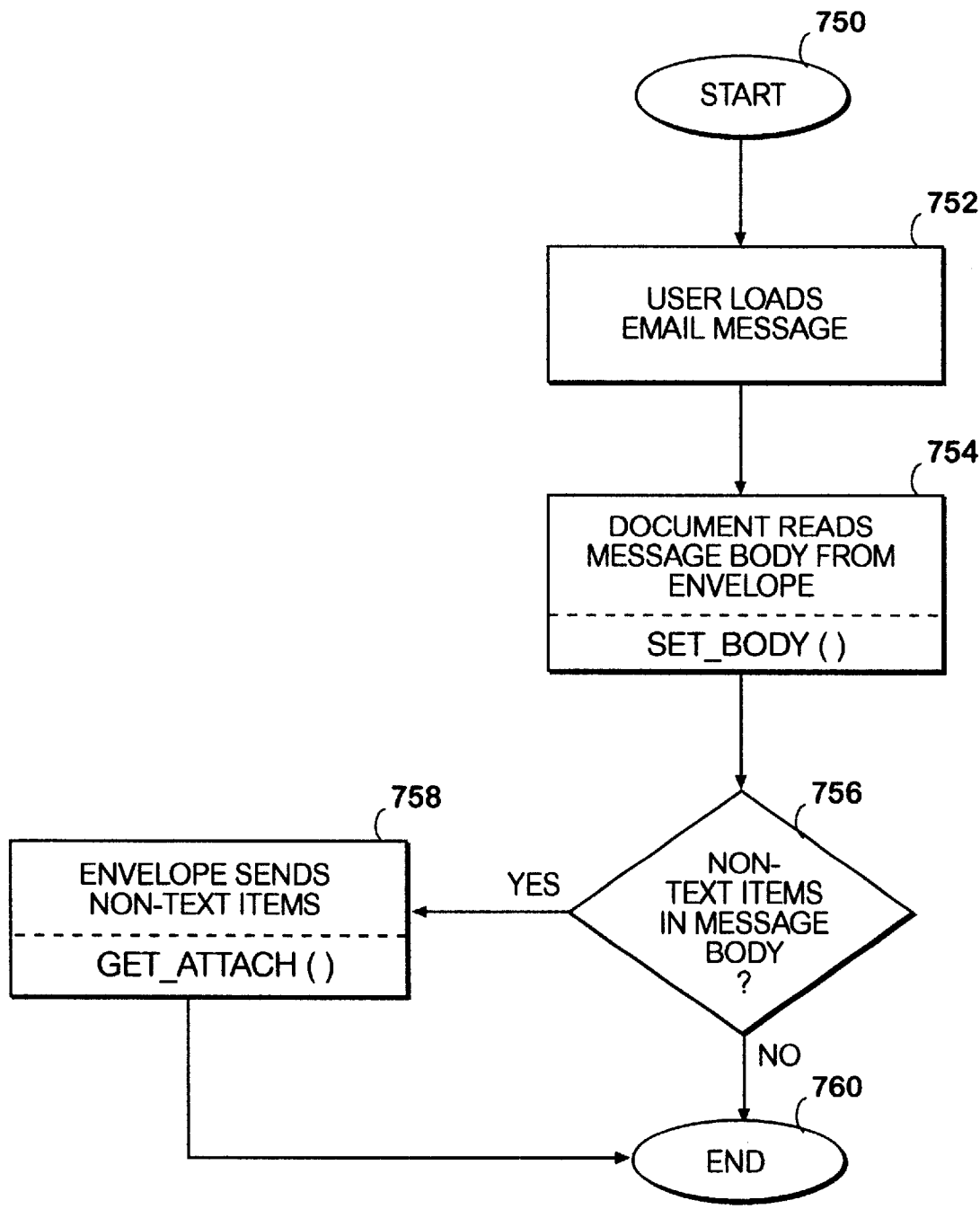
FIG. 7a is a flowchart depicting a method of interfacing an email client and a document editor in an exemplary embodiment of the present invention.
Figure 7B:
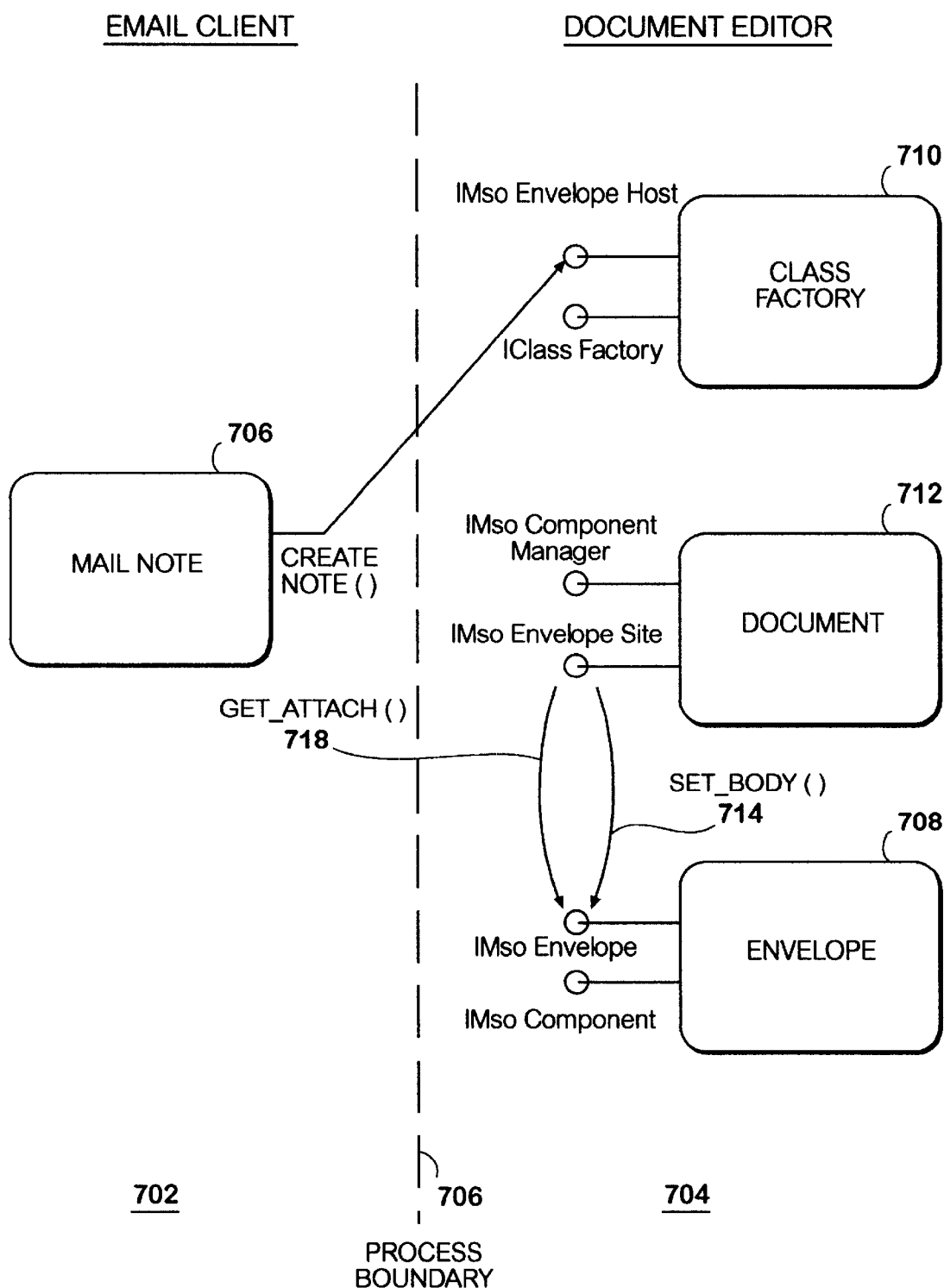
FIG. 7b is a block diagram depicting the interface between an email client and a document editor in an exemplary embodiment of the present invention.

Referring now to FIG. 7a, a flowchart is depicted, illustrating a method of an exemplary embodiment of the present invention when the user attempts to load an email message into the document editor. The flowchart depicts the method as a series of steps, many of the steps include a description of the step as well as an OLE function call associated with the step. FIG. 7b is a modified version of the Envelope interface diagram depicted in FIG. 5, with the function calls depicted with arrows indicating the source component and recipient component of each call.

Referring now to FIGS. 7a and 7b, the method begins at step 750 and proceeds to step 752. At step 752, the user elects to load an email message into the document editor. The method proceeds to step 754, at which the Document component 712 reads the Message Body data from the Envelope component 708. This reading step is enabled by the Document component 712 calling the SetBody ( ) function call 714. The method then proceeds to step 756 at which the Envelope component 608 begins transmission of the Message Body to the Document component 612.

During transmission of the Message Body, the Document monitors the document for non-text Message Body data, such as graphics. At step 756, a determination is made as to whether non-text items exist in the Message Body. If no non-text items exist in the Message Body, then the method branches to step 760 and ends. If non-text items exist in the Message Body, then the method branches to step 758 and the Document component 712 calls the GetAttach ( ) function call 718, enabling the transmission of the non-text items to the Document component 712. The method then branches to step 760 and ends.

Other Envelope Interfaces

The functions calls detailed in connection with FIGS. 6 and 7 are the primary function calls for invoking and closing and Envelope. However, there are many other function calls that are commonly used to implement selected functions with respect to the Envelope and/or the EUI. Tables I, II, and III detail the function names and brief descriptions of several common function calls that are made to the IMsoEnvelope, IMsoEnvelopeSite, and IMsoEnvelopeHost interfaces, respectively. All of the functions detailed above, in connection with FIGS. 6 and 7, are also briefly described in the Tables.

TABLE I

IMsoEnvelope Function Calls

| | |
|---|---|
| Init () | Prepares a new Envelope for use |
| SetParent () | Specifies the window to which the EUI is to be parented |
| Resize () | Dictates the rectangle of the EUI |
| Show () | Sets the visible state of the EUI |
| Save () | Saves the Envelope data |
| GetAttach () | Retrieves an attachment created via SetAttach () |
| SetAttach () | Creates a new in-line attachment to the message |
| SetHelpMode () | Specifies that the Envelope should enter or leave a context-sensitive help mode |
| NewAttach () | Creates a new "user" attachment, as in response to Insert/File command by user |
| SetFocus () | Tells the EUI to acquire the input focus. |
| GetHeaderInfo () | Gets a property from the Envelope |
| SetHeaderInfo () | Parallel to GetHeaderInfo. |
| IsDirty () | Returns False signal if Envelope has no changes to save, and a True signal if it does |
| GetLastError () | Returns a user-readable string to explain error |

TABLE II

IMsoEnvelopeSite Function Calls

| | |
|---|---|
| ReguestResize () | Site may use this call to limit the height of the Envelope |
| CloseNote () | The current document needs to close. If document behavior was specified in INIT () function call, then the document should remain open but close the EUI |
| GetBody () | Asks the site to save the Message Body. GetBody () can be called multiple times to get any format of the same Message Body (e.g., an HTML version and a plain text version). |
| SetBody () | Gives the site the Message Body for a note that is being loaded (e.g., in HTML, plain text, or MHTML). |
| SetFocus () | Directs the document editor to put the focus in the Message Body |
| OnEnvSetFocus () | Notifies the site that the EUI has taken the input focus |
| DirtyToolbars () | Tells the site to consider such commands as "cut" or "copy" to be out-of-date |
| OnPropChange () | Notifies the site that a property has changed so that particular actions can be taken in response to the changed properties. |
| IsBodyDirty () | Asks whether the Message Body itself has been changed since the last save. |
| HandsOff () | Directs the site to release all pointers to storages and streams from the Envelope |
| GetMsoInst () | Returns the MICROSOFT OFFICE instance handle |
| GetFrame () | Returns the top-level window |
| DisplayMessage () | Displays an error message |
| SetHelpMode () | Same as IMsoEnvelope::SetHelpMode () |

TABLE II-continued

IMsoEnvelopeSite Function Calls

| | |
|---|---|
| TranslateAccelerator () | Allows the document editor to trap accelerator messages before they are processed by the Envelope |

TABLE III

IMsoEnvelopeHost Function Calls

| | |
|---|---|
| CreateNote () | Creates a new mail note |
| LockServer () | Prevents the document editor from shutting down |

Synopsis of the Detailed Description

The present invention is directed to a system and method for integrating the functionality of an application program (e.g., an email client) into a document editor (e.g., word processor), such that the functionality is available to a user while the user is editing a document in the document editor. The present invention provides an improved system and method for editing, viewing, and transmitting electronic mail (email) messages. Generally described, the invention employs an Envelope data architecture to provide the functionality of an email client within the user interface of a document editor (e.g., word processor, spreadsheet, database, etc.). Users can invoke the Envelope and access the email client's functionality within the context of the document editor's user interface.

The Envelope concept is more efficient that other functionality integration models, because the Envelope embeds (using OLE) a small User Interface object into the document editor, rather than a large object embodying an entire application program (e.g., an email client). In previous functionality integration models, an entire document editor would be embedded into an email note of the email client as an object and the document editor would receive data from the embedded object. In the Envelope model, the document editor can pass its data to the Envelope for manipulation. Thus, instead of data being passed to the object for storage and subsequent use by the email client, the Envelope acts as a conduit, providing immediate use by the email client.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for generating an electronic mail (email) message within a document editor comprising a Document Editor User Interface (DEUI), by invoking an Envelope operative for integrating the functionality of an email client and the document editor, the Envelope comprising Envelope Data and Message Body data, the method comprising the steps of:

displaying a document in a portion of the DEUI in the document editor;

invoking the Envelope from within the document editor;

in response to invoking the Envelope, displaying an Envelope User Interface (EUI) associated with the email message within a portion of the DEUI, the EUI being integrated with the DEUI to appear as a toolbar of the DEUI;

incorporating the document into the Message Body data of the Envelope, the Message Body data being associated with the email message;

receiving Envelope data as input within the document editor, the Envelope data being associated with the email message; and in response to an input signal, invoking the Envelope to transmit the email message in accordance with the Envelope data associated with the email message.

2. The method of claim 1, wherein the Message Body data comprises plain text.

3. The method of claim 1, wherein the Message Body data comprises rich text.

4. The method of claim 1, wherein the Message Body data comprises Hyper Text Markup Language (HTML).

5. The method of claim 1, wherein the Envelope data comprises at least one addressee.

6. The method of claim 1, wherein the Envelope data comprises at least one Internet location for publishing the Message Body on a website.

7. The method of claim 1, wherein the Envelope data comprises at least one subject.

8. The method of claim 1, wherein the Envelope data persists with respect to the email message.

9. The method of claim 1, wherein the Envelope data persists with respect to the Envelope.

10. The method of claim 1, wherein the EUI comprises a command bar for invoking the functionality of the email client.

11. The method of claim 1, wherein the EUI comprises a display area for displaying the Envelope data.

12. The method of claim 1, wherein the EUI is displayed within a frame of the DEUI.

13. The method of claim 1, wherein the step of invoking the Envelope to transmit the email message comprises the step of publishing the Message Body to a website.

14. The method of claim 13, wherein the step of invoking the Envelope to transmit the email message further comprises the step of notifying users that the email message has been published to the website.

15. The method of claim 13, wherein the step of invoking the Envelope to transmit the email message further comprises the step of enabling the receipt of comments from users having access to the website.

16. A computer system for generating an electronic mail (email) message comprising Message Body data and Envelope data within a document editor, comprising:

a processing unit;

an input device connected to the processing unit; and a display device connected to the processing unit;

the processing unit, responsive to instructions from an Envelope running on the computer system, being operative to:

open the document editor in a window, the document editor comprising a Document Editor User Interface (DEUI) and display the DEUI on the display device;

display a document in a portion of the DEUI in the document editor;

display an Envelope User Interface (EUI) in a portion of the DEUI in the window on the display device, wherein the EUI is integrated within the DEUI so as to appear as a toolbar of the DEUI;

incorporate the document into the Message Body data of the email message;

receive Envelope data from the input device, the Envelope data associated with the email message;

display selected portions of the Envelope data within a portion of the EUI;

in response to the receipt of a send signal from the input device, invoke the Envelope to transmit the email message comprising the Envelope data, and the Message Body data in accordance with the Envelope data.

17. The system of claim 16, wherein the Message Body data comprises a selected one of plain text, rich text, and Hyper Text Markup Language (HTML).

18. The system of claim 16, wherein the Envelope data comprises at least one addressee and at least one subject.

19. The system of claim 16, wherein the Envelope data persists with respect to the email message.

20. The system of claim 16, wherein the Envelope data persists with respect to the Message Body data.

21. The system of claim 16, wherein the EUI is displayed within a frame of the DEUI and comprises:

a command bar for invoking the functionality of an email client; and a display area for displaying the Envelope data.

22. The system of claim 16, wherein the step of invoking the Envelope to transmit the email message comprises the step of publishing the Message Body data to a website.

23. The system of claim 22, wherein the step of invoking the Envelope to transmit the email message further comprises the step of notifying users that the Message Body data has been published to the website.

24. The system of claim 22, wherein the step of invoking the Envelope to transmit the email message further comprises the step of enabling the receipt of comments from users having access to the website.

25. The system of claim 16, wherein the Envelope data persists with respect to a data file containing the Message Body data.

26. A computer readable medium on which is stored computer-executable instructions for generating an electronic mail (email) message within a document editor opened in a single window, the computer-executable instructions, when executed by a computer, operative to perform the steps of:

retrieving message content data associated with the email message from a message data file;

retrieving message address data associated with the email message from the message data file;

opening the document editor for modifying the message content data;

within the single window, displaying the email message in the document editor including a message content region and a message address region, the message content region including at least a portion of the message content data, the message address region including at least a portion of the message address data; and transmitting the email message by invoking an object interface for providing the message content data and the message address data to an email client and for integrating the functionality of an email client with that of the document editor.

27. The computer readable medium of claim 26, wherein the message content data comprises a selected one of plain text, rich text, and Hyper Text Markup Language (HTML).

28. The computer readable medium of claim 26, wherein the document editor is a selected one of a word processor application program, a spreadsheet application program, a data base application program, and a graphical presentation application program.

29. The computer readable medium of claim 26, wherein the object interface conforms to the Object Linking and Embedding (OLE) interface standard.

30. The computer readable medium of claim 26, wherein the message content region comprises a first plurality of command bars and the message address region comprises a second plurality of command bars.

31. The computer readable medium of claim 30, wherein the first plurality of command bars of the message content region provide control of the document editor.

32. The computer readable medium of claim 30, wherein the second plurality of command bars of the message address region provide control of the email client.

33. The computer readable medium of claim 26, wherein the message address data associated with the email message persists with respect to the message data file.

34. A method for generating an electronic mail (email) message within a document editor by invoking an Envelope operative for integrating the functionality of an email client within the document editor, the method comprising the steps of:

creating a Document object having a Document interface;

creating an Envelope object having an Envelope interface, the Envelope interface integrated within the Document interface so as to appear as a toolbar of the Document interface, the Envelope interface further capable of sending function calls to the Document interface and receiving function calls from the Document object;

sending a first function call to the Document interface for transmitting a Message Body of a document to the Envelope object;

sending a second function call to the Document interface for transmitting attachments of the document to the Envelope object;

sending an email message containing the Message Body and the attachments, to a predefined recipient, wherein the Message Body comprises the Document; and in response to a completion of the sending the email message step, closing the document.

35. The method of claim 34, wherein the closing the document step comprises closing the Envelope interface.

36. The method of claim 34, wherein the first function call comprises a GetBody function call.

37. The method of claim 34, wherein the second function call comprises a SetAttach function call.

38. The method of claim 34, wherein the closing the document step comprises sending a third function call to the Document object.

39. The method of claim 38, wherein the third function call comprises a CloseNote function call.

40. A method for generating an electronic mail (email) message within a document editor by invoking an Envelope operative for integrating the functionality of an email client and the document editor within the document editor, the method comprising the steps of:

opening an Envelope User Interface (EUI) within the document editor as an integral portion of a Document Editor User Interface (DEUI);

retrieving from a first message data file a Document object having a Document interface;

retrieving from a second message data file an Envelope object having an Envelope interface, the Envelope interface capable of sending function calls to the Document interface and receiving function calls from the Document object;

sending a first function call to the Envelope interface for retrieving a Message Body of a document from the Envelope object;

sending a second function call to the Envelope interface for retrieving attachments of the document from the Envelope object;

sending a third function call to the Envelope interface for retrieving Envelope data associated with the document from the Envelope object;

displaying the Message Body within the DEUI; and displaying the Envelope data within the EUI, which is integrated within a portion of the DEUI displayed in the document editor, so as to appear as a toolbar of the DEUI.

41. The method of claim 40, wherein the first function call comprises a SetBody function call.

42. The method of claim 40, wherein the second function call comprises a GetAttach function call.

43. The method of claim 42, wherein the third function call comprises a GetHeaderInfo function call.

44. A method for generating an electronic mail (email) message within a document editor by invoking an Envelope operative for integrating the functionality of an email client and the document editor, the method comprising the steps of:

receiving Envelope data as input to the Envelope, the Envelop data associated with the email message;

receiving Message Body text as input to the document editor;

displaying a Document Editor User Interface (DEUI) comprising the Message Body text;

displaying the Message Body text in an editing region of the DEUI;

displaying an Envelope User Interface (EUI) integrated within the DEUI as one of a plurality of toolbars, the EUI comprising the Envelope data associated with the email message; and in response to an input signal, invoking the Envelope to transmit the email message in accordance with the Envelope data associated with email message, wherein the email message comprises a Message Body field and an attached data field, the Message Body field comprises the Message Body text displayed in the document editor.

* * * * *

UNITED STATES PATENT AND TRADEMARK OFFICE
CERTIFICATE OF CORRECTION

PATENT NO.    : 6,405,225 B1
DATED         : June 11, 2002
INVENTOR(S)   : Apfel et al.

It is certified that error appears in the above-identified patent and that said Letters Patent is hereby corrected as shown below:

Column 11,
Line 24, "funcionality" should be -- functionality --.

Signed and Sealed this

First Day of October, 2002

*Attest:*

*Attesting Officer*

JAMES E. ROGAN
*Director of the United States Patent and Trademark Office*